June 30, 1931.  C. O. PETERSEN  1,812,663

ANTISIDE SLIP ATTACHMENT FOR CORN PLANTERS

Filed Dec. 21, 1929

Inventor
Christ O. Petersen
By Lynn H. Latta
Attorney

Patented June 30, 1931

1,812,663

UNITED STATES PATENT OFFICE

CHRIST O. PETERSEN, OF ANTHON, IOWA

ANTISIDE SLIP ATTACHMENT FOR CORN PLANTERS

Application filed December 21, 1929. Serial No. 415,642.

My invention relates to a guide attachment for corn planters and has for its object to provide a device adapted to prevent side slipping of the corn planter when operating on a side hill.

A further object of my invention is to provide a device adapted to cooperate with the ground so as to receive lateral support therefrom without offering any resistance to the forward motion of the corn planter.

The foregoing object is accomplished by the employment of a rolling cutter or disc carried by the frame of the corn planter at the rear thereof and journalled for rotation about a horizontal axis transverse to the direction of travel of the corn planter, the cutter being perfectly flat and adapted to enter the ground so as to present a wide surface bearing against the earth in a lateral direction and a thin, knife edge adapted to cut through the earth in the direction of travel of the corn planter.

Another object of my invention is to provide means for mounting the disc relative to the corn planter, whereby the disc may be removed from the ground when necessary or desirable.

Another object is to provide an arrangement connecting the supporting frame of the disc to the planter frame and to a moving portion of the planter mechanism whereby when the planter shoes are withdrawn from the ground, the disc will be withdrawn in unison therewith.

Another object is to provide an arrangement in which when the shoes of the planter are depressed so as to enter the ground, the disc will correspondingly be moved into the ground.

Another object is to provide an arrangement in which the operator may supplement the automatic action of the control arrangement just mentioned by manual control of the disc, whereby the disc may be removed from the ground at the will of the operator without disturbing the planter shoes.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figures 1, 2:
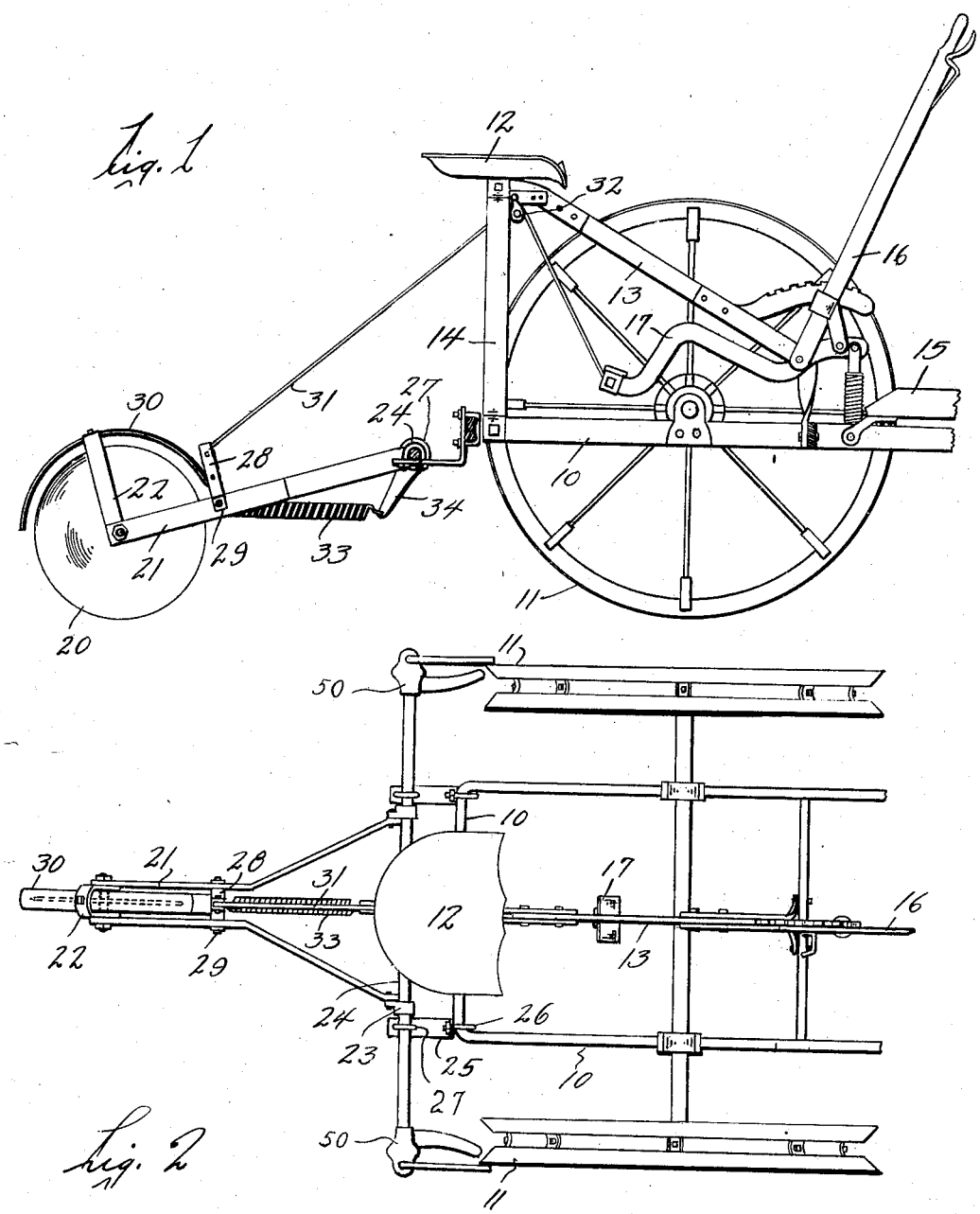
Fig. 1 is a side elevation of a planter equipped with my invention.
Fig. 2 is a plan view of the same.

I have used the reference character 10 to indicate generally the U shaped main frame of a planter of the popular type. The wheels of the planter are illustrated at 11, the seat at 12, the seat bracket at 13 and 14, respectively, the planter tongue at 15, the balance crank lever for controlling the planter shoes at 16 and the foot lever forming a part of the bell crank lever assembly at 17.

The planter shoes having no direct connection with the device of my invention have not been illustrated. It will be understood that when the lever 16 is pulled rearwardly the planter shoes will be elevated, the shoes being connected with a framework embodying as an integral part the tongue 15.

The anti-slipping device of my invention is shown in Fig. 1 in its depressed position. It comprises a flat, steel disc 20, preferably having a sharp edge adapted to cut away through the ground. The disc 20 is journalled in suitable bearings in a frame comprising a pair of side arms 21, connected at their rear ends by a yoke 22 and spread apart at their forward ends and secured to bearings 23.

The bearings 23 are journalled on a stub shaft 24, which is secured to brackets 25, carried by the rear cross bar of the frame 10. The brackets 25 are formed of L shaped pieces of strap iron, bolted to the frame 10 and to the shaft 24 by means of U bolts 26 and 27, respectively. It will be understood that any suitable bracket structure might be employed for supporting the shaft 24 or that any suitable means for providing a hinge connection between the frame 21 and the corn planter frame might be substituted for the particular structure shown and described.

A bracket 28 is secured between the arms of the frame 21 by means of a bolt 29 extending through the arms 21 and through the arms of the bracket. A guard 30 is secured to the yoke 22 and to the bracket 28 serving to support the bracket 28 against forward movement. The guard 30 is employed to prevent injury to a person from the cutter 20.

A cable 31 is secured to the bracket 28, extends over a pulley 32 hung from the seat bracket 13 and thence extends forwardly and downwardly and is secured to the step of the foot lever 17 as shown.

A spring 33 is secured at one end to the bolt 29 and at its other end to an arm 34, supported on the shaft 24. It will be understood that any suitable means for securing one end of the spring 33 to the planter frame or to the shaft 24 or the means connecting the shaft 24 or the planter frame might be employed. It will further be understood that the spring 33 might be secured to the guard frame 21 at any point removed from the hinge axis of the guard frame.

The guard frame is substantially triangular shaped in construction having a long axis of attachment to the planter frame in order to provide lateral support. It will now be seen that any slipping tendency of the planter on a side hill will be transmitted through the substantially rigid guard frame to the flat, broad disc 20, which, by its engagement with the ground, will resist the side slipping tendency. In this connection, it will be understood that the disc 20 will travel with approximately one-third of its area positioned below the ground level.

When the foot pedal 17 is depressed, the cable 31 will transmit this movement to the guard frame, raising the disc 20 out of the ground. When the foot pedal is released and allowed to return to its normal position, the spring 33 will force the disc 20 back into the ground.

It will be understood that when turning corners, the disc 20 would interfere with the turning movement of the planter if it were allowed to remain in the ground. The shoes are normally lifted from the ground during such turning movement and consequently it is desirable to raise the disc at the same time.

The operator may raise the disc at any time if he so desires without interfering with the shoes by reaching back and grasping the cable 31 and pulling upwardly.

The shaft 24 may be employed as a substitute for the shaft on which the marking devices 50 of the usual corn planter are mounted. The construction and operation of the markers 50 is the same as in present types of planters and does not form a part of my invention. By employing the shaft 24 as a support for the marking devices, the usual shaft employed for that purpose may be dispensed with. The same result can be accomplished by mounting the anti-side slipping attachment directly on the marker shaft in its present position.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In a corn planter, a main frame, planter shoes, a foot lever to aid in elevating the planter shoes, a guide frame hinged to the main frame, projecting rearwardly and movable vertically, a flat disc journalled in the guide frame on an axis transverse to the planter's line of travel and adapted to travel in the ground behind the planter, exerting resistance to lateral movement of the planter, but not to forward movement, thereof, and means connecting the foot lever to the guide frame whereby depression of the foot lever will elevate the disc.

2. In a corn planter, a main frame, planter shoes, a guide frame hinged to the main frame projecting rearwardly, and movable vertically, a flat disc journalled in the guide frame on an axis transverse to the planter's line of travel and adapted to travel in the ground behind the planter, exerting resistance to lateral movement of the planter, but not to forward movement thereof, and means connecting the guide frame to a portion of the planter whereby when the planter shoes are elevated, the disc will be correspondingly elevated.

3. In a corn planter, a main frame, planter shoes, shoe elevating means, a guide frame hinged to the main frame, projecting rearwardly, and movable vertically, a flat disc journalled in the guide frame on an axis transverse to the planter's line of travel, and adapted to travel in the ground behind the planter, exerting resistance to lateral movement of the planter but not to forward movement thereof, and means connecting the guide frame to the shoe elevating means whereby when the planter shoes are elevated the disc will be correspondingly elevated.

4. In a corn planter, a main frame, planter shoes, a foot lever to aid in elevating the planter shoes, a guide frame hinged to the main frame, projecting rearwardly and movable vertically, a flat disc journalled in the guide frame on an axis transverse to the planter's line of travel and adapted to travel in the ground behind the planter, exerting resistance to lateral movement of the planter, but not to forward movement, thereof, resilient means tending to urge the disc into the ground, and means connecting the foot lever to the guide frame whereby depression of the foot lever will elevate the disc.

Signed this 12th day of December, 1929, in the county of Woodbury and State of Iowa.

CHRIST O. PETERSEN.